United States Patent [19]

Erickson

[11] 4,402,795

[45] Sep. 6, 1983

[54] REVERSE ABSORPTION HEAT PUMP AUGMENTED DISTILLATION PROCESS

[76] Inventor: Donald C. Erickson, 1704 S. Harbor La., Annapolis, Md. 21401

[21] Appl. No.: 188,527

[22] Filed: Sep. 18, 1980

[51] Int. Cl.$^3$ .................... B01D 3/14; F25B 15/06
[52] U.S. Cl. .................................. 203/25; 203/19; 203/42; 203/100; 203/DIG. 4; 62/101; 62/324.2; 62/476; 202/184; 261/128
[58] Field of Search ............... 203/DIG. 4, 100, 10, 203/11, 18, 19, 21, 24–26, 42; 202/182–184; 62/324.2, 476, 101, 102; 261/128; 55/32, 49, 59, 161, 208

[56] References Cited

U.S. PATENT DOCUMENTS

| | | | |
|---|---|---|---|
| 2,212,869 | 8/1940 | Tornquist | 62/324.2 |
| 2,272,871 | 2/1942 | McGrath | 62/324.2 |
| 3,288,686 | 11/1966 | Othmer | 203/11 |
| 4,070,870 | 1/1978 | Bahel et al. | 62/324.2 |
| 4,094,355 | 6/1978 | Blytas | 62/101 |
| 4,102,388 | 7/1978 | Blytas | 62/101 |
| 4,134,273 | 1/1979 | Brautigam | 62/476 |
| 4,167,101 | 9/1979 | Rojey | 62/101 |
| 4,207,751 | 6/1980 | Kampfenkel et al. | 62/476 |
| 4,209,364 | 6/1980 | Rothschild | 203/DIG. 4 |

OTHER PUBLICATIONS

"A New Absorption-Cycle Process for Upgrading Waste Heat" I.E.C.E.C. 14th Proceedings ACS.-G. Cohen et al. 1979, pp. 1920–1724.
Development Status and Utility of the Sulfuric Acid Chemical Heat Pump/Chem. En. Stor. Syst. (15th I.E.C.E.C.) 1980, Clark et al.
Energy Saving Alternatives to Distillation: F. E. Rush, Jul. 1980, *Chemical Engineering Progress*, vol. 76, No. 8.

*Primary Examiner*—Wilbur L. Bascomb, Jr.

[57] ABSTRACT

The invention provides a means for reducing the energy consumed by thermally activated separation processes such as fractional distillation. This is done by recovering at least part of the reject heat from such processes and upgrading it for recycle back to input heat. The upgrading is accomplished by another low temperature source of heat which may also be the separation process reject heat. A simple and reliable heat pump using the reverse absorption principle is incorporated in the separation process to accomplish this upgrading.

10 Claims, 2 Drawing Figures

REVERSE ABSORPTION HEAT PUMP AUGMENTED DISTILLATION PROCESS

DESCRIPTION

Technical Field

The technical field of this invention comprises separation processes such as fractional distillation wherein heat is supplied to the process at a first temperature and rejected at a second temperature lower than the first, and wherein at least part of the reject heat is recovered and recycled to the supply, thereby reducing the amount of external heat which must be supplied to the process.

Background Art

In the process of fractional distillation, a mixed multi-component stream of liquids having different relative volatilities is subjected to multiple countercurrent stages of gas liquid contact. The gas is generated by boiling at least part of the concentrated low volatility component at the bottom of the contactor in a reboiler, and reflux liquid is provided by condensing part of the concentrated high volatility gas at the top of the contactor (or fractionating column) in a reflux condenser. Thus a substantial amount of heat must be input to the process at the boiling temperature of the less volatile component, and the same amount (less losses) must be removed from the process at the lower condensing temperature of the more volatile component. This is a general characteristic of a great number of thermally activated separation processes; that heat must be supplied at a given temperature above ambient, and subsequently removed at a somewhat lower temperature which is still above ambient. For example, acid gas removal processes, gas drying processes, and many other gas purification processes have this requirement.

The large amount of relatively low temperature heat required in these processes is a problem in two regards; both the furnishing and the removal of it. Clearly a system which recycles a substantial fraction of the reject heat to the input will provide a double-edged advantage. There has long been an interest in recovering and recycling at least part of this reject heat, as attested by patents in U.S. class 203-26 and 21+ and elsewhere. Three recent journal articles summarize the current approaches to recovering and recycling this energy. The articles are: "Low Energy Separation Processes" by J. H. Bojnowski and D. L. Hanks in the May 7, 1979 issue of *Chemical Engineering* Vol. 86 No. 10; "Energy Saving Alternatives to Distillation" by F. E. Rush in the July 1980 *Chemical Engineering Progress* Vol. 76 No. 7; and "Energy Conservation in Distillation" by R. M. Stephenson and T. F. Anderson in the August 1980 *Chemical Engineering Progress* Vol. 76 No. 8. The energy recovery and recycling techniques described can be categorized as compressor driven heat pumps, vapor recompression (i.e. "open cycle" heat pump), multiple effect or split tower arrangements, interstage heating and cooling, feed stream/product stream heat exchange, and combinations of the above.

The problems with the current practice distillation energy recovery techniques are as follows. The interstage and heat exchange techniques do not actually reduce the amount of energy required, but merely reduce the temperature at which part of it is required. The multiple effect technique incorporates pressure gradients in order to achieve temperature gradients, and requires substantial additional equipment—at least one entire additional column, plus equipment to establish and maintain the pressure gradient. The compressor driven heat pump requires excessive mechanical or electrical drive power unless the column ΔT (and hence pressure ratio) is quite low. It is also expensive to procure and maintain, and in the case of the lower cost centrifugal machines, has a very limited turn down capability.

Absorption heat pumps have been known and used for many years, as indicated by patents in U.S. class 62-476+. They have predominantly been used as means for extracting heat, i.e. refrigeration or air conditioning machines, but in recent years are finding increasing application as means for supplying heat as well. Functionally the absorption heat pump is powered by an input supply of heat at high temperature, which causes it to extract (or absorb) heat at a low temperature and reject (or supply) heat at an intermediate temperature.

In the reverse absorption heat pump (RAHP) the above relationships are reversed. Heat is input to the RAHP at an intermediate temperature, and part of the heat is extracted at low temperature, which causes the remainder of the heat to be rejected (or supplied to an external load) at high temperature. The functional characteristics of the RAHP have been described in the paper "A New Absorption—Cycle Process for Upgrading Waste Heat" by G. Cohen, J. Salvat, and A. Rojey which appears in the 1979 Proceedings of the 14th *Intersociety Energy Conversion Engineering Conference* published by the American Chemical Society. U.S. Pat. Nos. 4,167,101, 4,094,355, and 4,102,388 describe various specific embodiments of RAHP apparatus.

Disclosure of Invention

A fractional distillation process is provided in which at least part of the heat required at the reboiler is provided by indirect heat exchange with an absorbent solution which is absorbing a gaseous working fluid at a first pressure; and in which the absorbent solution is regenerated for recycle to additional absorption by lowering its pressure to a second pressure no more than 70% of the first pressure, supplying heat to it to desorb gaseous working fluid at the second pressure, and restoring its pressure to approximately the first pressure; and in which the gaseous working fluid at first pressure is provided by condensing the gaseous working fluid at second pressure, increasing its pressure to approximately the first pressure, and supplying heat to boil it; and in which at least one of the heat supplies necessary for boiling the working fluid and for regenerating the absorbent solution is provided by indirect heat exchange from the heat rejected at the reflux condenser.

This process provides the ability to recover and recycle between 40% and 100% of the energy from the reflux condenser to the reboiler. The equipment required is simple, reliable, and economical—it consists essentially of heat exchangers and pumps. The amount of additional electrical energy required is negligible in comparison to the amount of energy saved. The process can efficiently recover and recycle even low temperature heat, e.g. 70° C. or less. It can also easily handle recovery in situations where there is a large temperature differential between reboiler and reflux condenser. It can handle part load operation even more efficiently than full load, and is easy to start up and shut down. It is not susceptible to surge, overload, imbalance, or other problems which affect compressor driven heat pump energy recycle. With the optional additional heat exchangers to be described, it can recover and recycle at least 70% of the theoretical amount of heat it is possible to recover. With provision for a low temperature heat input such as solar or geothermal, it can completely eliminate the need for any higher temperature heat input.

Best Mode for Carrying Out the Invention

The reverse absorption heat pump functions through the interaction of two fluid loops. In one loop, an absorbent solution is circulated between high and low pressure containment vessels. In the low pressure vessel, heat is applied to the absorbent to cause it to boil off part of its more volatile component, i.e. the working fluid, thereby strengthening the absorbent solution and generating a low pressure gaseous working fluid. In the high pressure vessel, the strong absorbent absorbs high pressure gaseous working fluid, thereby weakening the absorbent (i.e. decreasing its affinity for gaseous working fluid) and generating heat at high temperature. This loop also incorporates a heat exchanger between the strong and weak absorbent and a pump. The second loop is supplied the low pressure gas from the low pressure gas generator, condenses it, pumps it to high pressure, and then boils it, thus producing the high pressure gas required by the high pressure absorber. In the condenser, heat is rejected from the process at the lowest process temperature, and heat must be supplied to the boiler.

Figure 1:
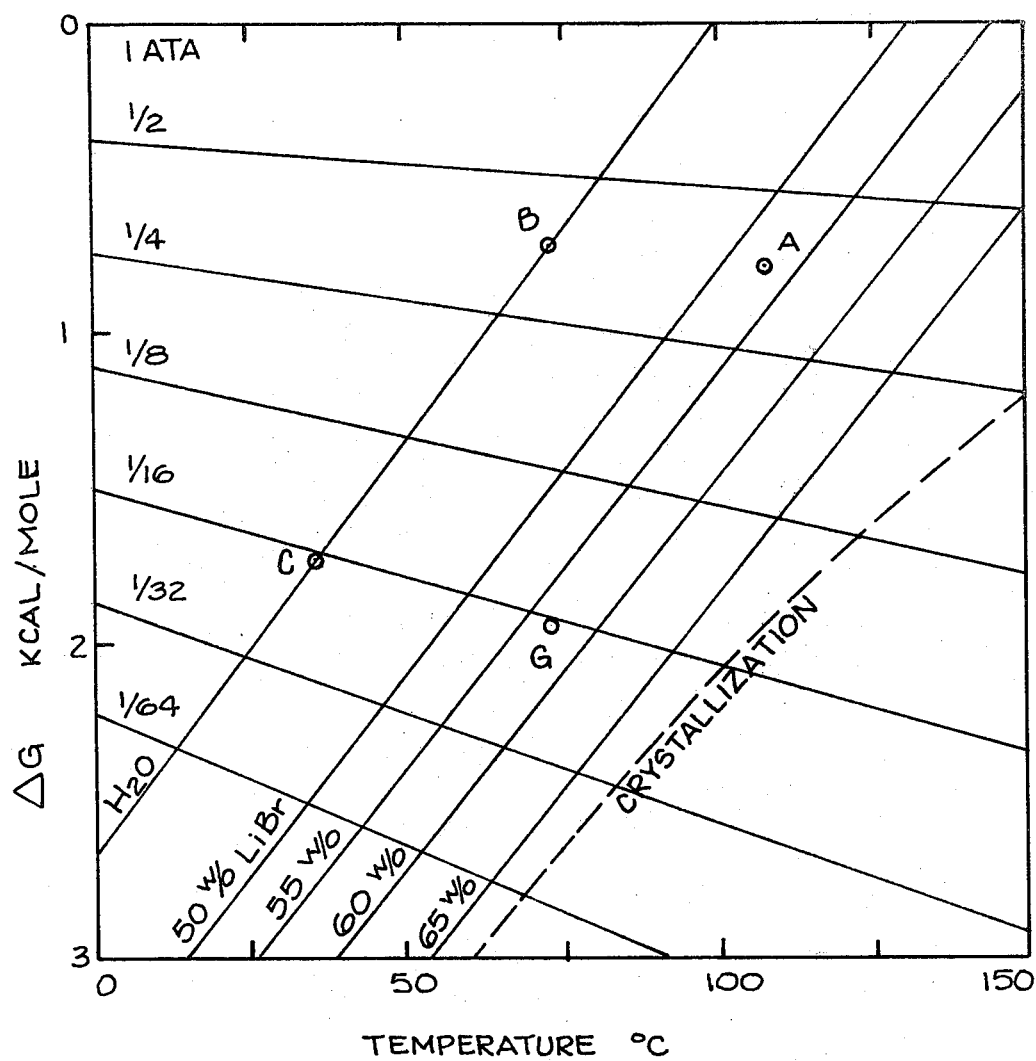
FIG. 1 illustrates the thermodynamic state points and relationships of a typical working fluid and absorbent solution while being used in the reverse absorption heat pump process.

FIG. 1 shows the state points of the working fluids in a reverse absorption heat pump during one complete cycle. The figure plots the change in Gibbs free energy of the vaporization reaction vs temperature. Contours of constant pressure are indicated on the graph, according to the relation $$\Delta G = -RT \ln p$$

This graph, a variation of the Ellingham diagram, is very useful for analyzing absorption cycles. The lines of constant composition are all approximately linear (slope is the change in entropy of the change in state from liquid to gas: approximately 21 cal/degree per Trouton's rule). The graph is drawn for the conventional and well known absorbent-working fluid combination of aqueous LiBr-H$_2$O, although many other combinations are also suitable. The graph reveals the saturation temperature and pressure of the gas-liquid equilibrium as a function of solution composition.

The four circled points on the diagram correspond to the exit conditions from the four gas-liquid contact vessels of the reverse absorption heat pump: G is the low pressure gas generator, C is the condenser, B is the boiler, and A is the high pressure gas absorber. The diagram shows heat being input to the boiler and low pressure gas generator at 73° C., being rejected from the condenser at 36° C., and being generated in the high pressure absorber at 107° C. These conditions would be appropriate for an RAHP which is incorporated into an atmospheric pressure ethanol distillation process which requires heat input to its reboiler above 100° C. and heat rejected from its reflux condenser at less than 80° C. assuming a 7° C. $\Delta T$ at each heat exchanger. Note that the respective high and low pressures in the H$_2$O-LiBr system at these conditions are $\frac{1}{3}$ and 1/16 atmospheres absolute. Note also that the strong absorbent leaving the low pressure gas generator is 57 w/o whereas the weak absorbent leaving the high pressure absorber is 53 weight percent (w/o) LiBr.

Figure 2:
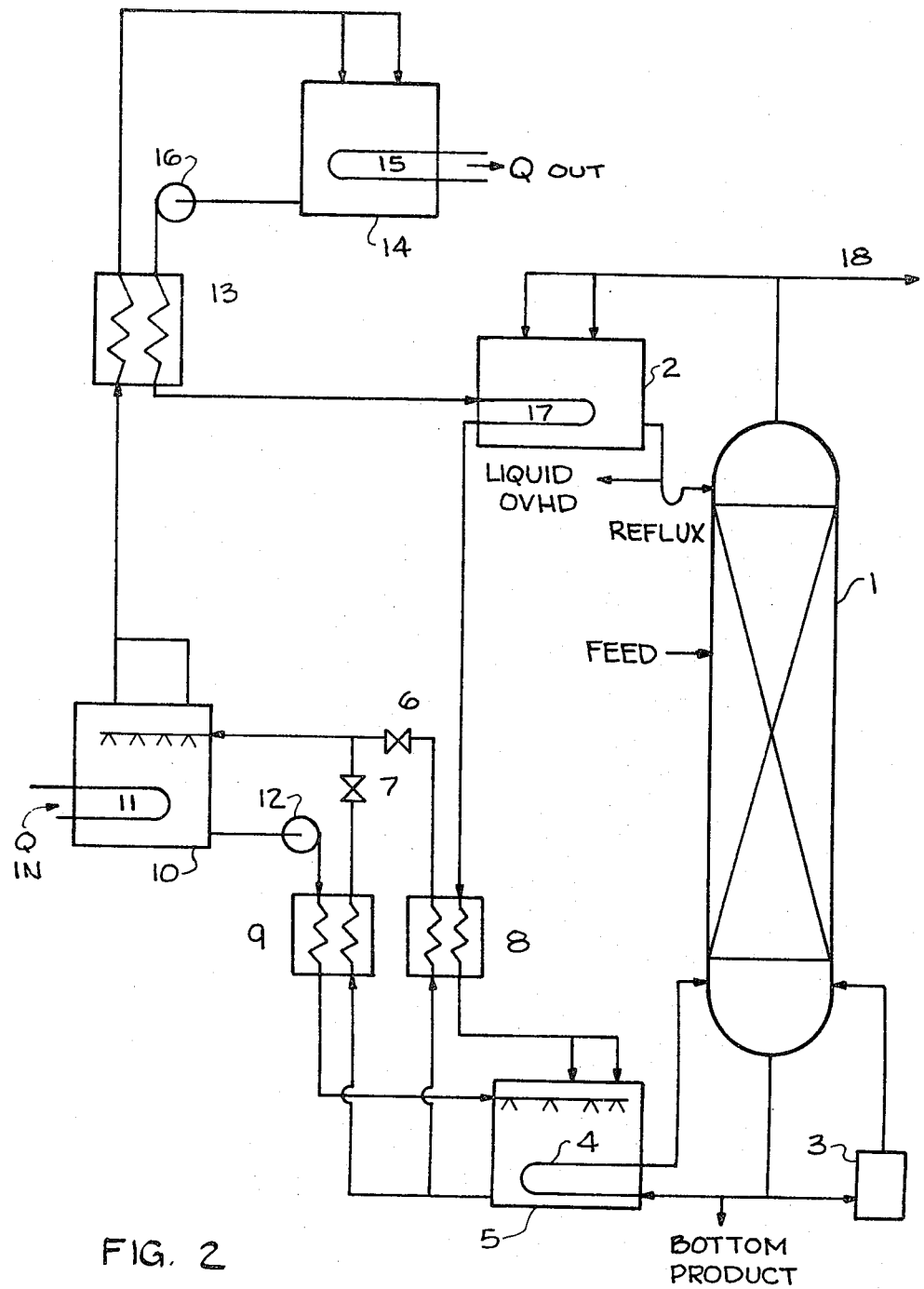
FIG. 2 is a simplified flowsheet of a fractional distillation process which has been augmented with RAHP to recover and recycle energy.

On the flowsheet depicted in FIG. 2 a multicomponent feed mixture is injected into fractionating column 1. The column fractionates the feed into a more volatile vapor phase overhead product and less volatile liquid phase bottom product. At least part of the overhead vapor is directed to reflux condenser 2, which condenses it to provide reflux and liquid overhead product. Part of the bottom product is reboiled in heat recovery reboiler 4, and if necessary additional reboiling is conducted in reboiler 3 heated by an external heat source. The heat provided to reboiler 4 is released by the absorption of gaseous working fluid (e.g. steam) into absorbent solution (e.g. aqueous LiBr) in absorber 5, which is in indirect heat exchange contact with reboiler 4. After absorbing steam, the weak absorbent solution is regenerated by being cooled down in heat exchangers 8 and 9, decreased in pressure by means for pressure reduction such as proportioning valves 6 and 7, and introduced into low pressure generator 10. Heat is indirectly supplied to generator 10 via means for heat transfer 11, causing steam to boil out of the absorbent solution. This steam will be substantially lower in pressure than the steam supplied to absorber 5, for example 70% less. This allows it to regenerate at temperatures lower than the absorber temperature. The strong solution is then increased in pressure by solution pump 12, regeneratively heated in heat exchangers 8 and 9, and recycled to the absorber. The low pressure steam from generator 10 is cooled in heat exchanger 13, condensed in condenser 14, and then pumped by feed pump 16 up to the pressure necessary to generate the steam pressure required in the absorber. Cooling is provided to condenser 14 by any conventional means such as for example providing ambient cooled cooling water via means for heat exchange 15. The pressurized feedwater is preheated in regenerative heat exchanger 13, then introduced into boiler 17 where it is indirectly heated and boiled by the heat of condensation from reflux condenser 2. The steam thus generated is superheated in heat exchanger 8 and directed to absorber 5 to complete the cycle. The heat exchangers 8 and 13 are optional for the H$_2$O-LiBr system, although they increase heat recovery performance by approximately 10%. For any other choice of working fluid, e.g. NH$_3$, organic or other inorganic condensable gases, they are much more important.

Overhead vapor in line 18 can be the source of heat to generator 10, by condensing it in heat exchanger 11. This results in the statepoint diagram shown in FIG. 1, i.e. both the boiler B and the generator G are supplied by the same heat source as indicated by the dashed line on FIG. 2, and hence are at approximately the same temperature. Under these conditions, the RAHP will typically deliver 0.8 joules in the absorber for every 1.8 joule supplied to the boiler and generator, where the remaining 1 joule is rejected at the condenser. Thus 44% of the heat available overhead is recycled to the reboiler. Under these conditions externally fired boiler 3 only supplies 60% of the heat required from it in the absence of RAHP heat recovery.

Figure 3:
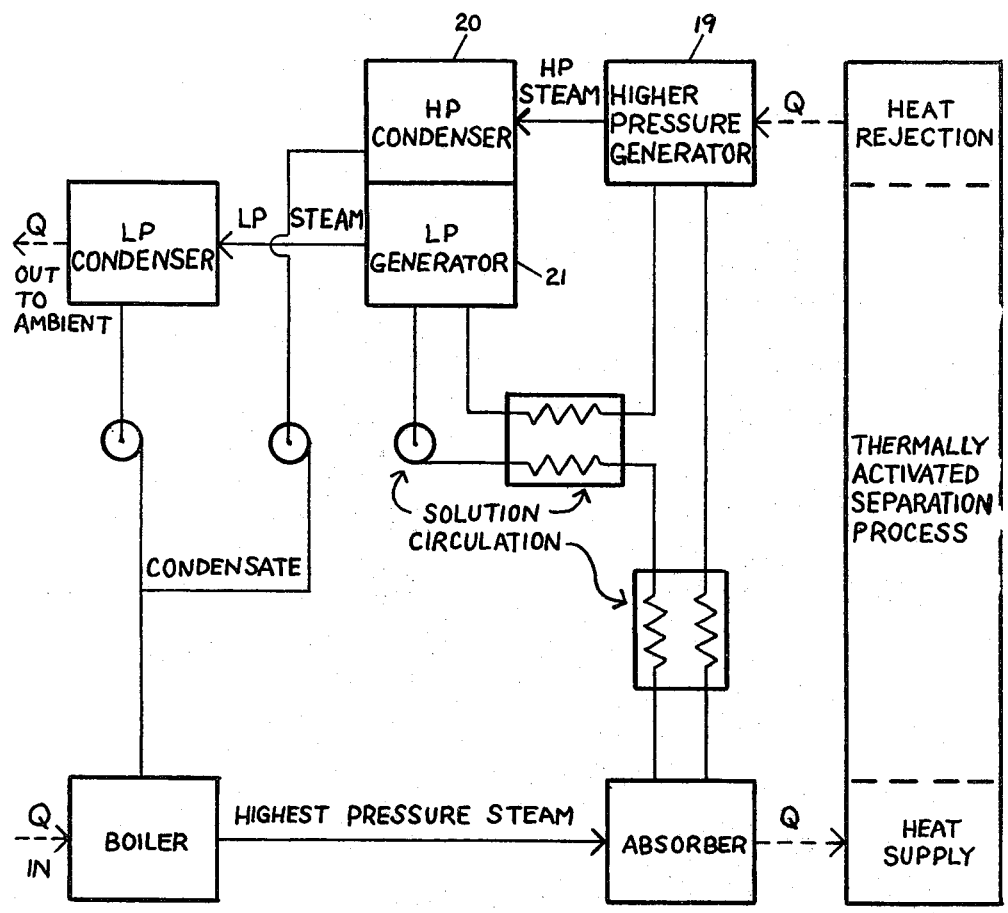

It is possible to further reduce the amount of heat supplied to reboiler 3 in at least two ways. One is to supply a separate external source of low temperature heat to the generator, as indicated when the dashed and dotted lines are deleted from FIG. 2 and to supply all of the overhead vapor condensation heat to the reflux condenser/boiler (or the converse). This reduces the need for external heat at reboiler 3 to less than 10%. A greater amount of heat is required at absorber 4, but the advantage is that its temperature is low, e.g. 68° C. vice 107° C. in the cited ethanol distillation example. Thus it can economically be provided by low cost solar collectors or ponds, geothermal, or waste heat sources. The second way is to reduce the amount of heat supplied for solution regeneration by incorporating two pressure staged generators. This embodiment is schematically illustrated by FIG. 3, wherein reject heat from the thermally activated separation process supplies the higher pressure generator 19, and higher pressure steam boiled out of it condenses in higher pressure condenser 20 which supplies heat to lower pressure generator 21. Steam boiled out of the lower pressure generator is condensed by heat rejection to ambient. The remainder of the process operates the same as the single stage process, with the understanding that the absorbent solution must be circulated to both generators and the condensate from both condensers must be returned to the boiler. Heat is only supplied to the higher pressure generator, and the steam boiled out of it is condensed so as to give up its condensation heat to the lower pressure generator, boiling lower pressure steam out of it. Only the lower pressure steam is condensed by heat rejection to ambient. Since relatively less heat is supplied to solution regeneration, and rejected to ambient, relatively more is recycled to the absorber and recovered. Approximately 56% recovery is possible vice the 44% from the single generator embodiment. Note that the two pressure staged generator embodiment requires two feed pumps, one taking suction on the lower pressure condensate and the other on the higher pressure condensate.

Two other advantageous embodiments within the scope of the present invention are as follows. In some instances, it will be possible to select as working fluid material of the same composition as the overhead vapor. Three examples would be steam, methanol, and ethanol (or mixtures containing predominantly one of them). In those instances it is possible to eliminate the combination reflux condenser 2/boiler 17. An appropriate amount of overhead vapor is routed directly to the absorber to become gaseous working fluid, and similarly an appropriate amount of condensed working fluid is withdrawn as liquid overhead product and reflux. This embodiment is indicated by the dotted lines on FIG. 2. This embodiment requires that the absorbent have low volatility in order to minimize loss of absorbent.

Although FIG. 2 reflects a very simple fractional distillation apparatus for ease of explanation, the RAHP recovery process applies equally to more complex arrangements. There may be multiple columns, multiple reboilers, and/or multiple reflux condensers. A single RAHP can serve multiple heat sources and sinks with a single circulating absorbent solution by providing a separate absorber plus boiler or generator plus condenser plus pump for each temperature level. Other heat recovery techniques may be present, e.g. multiple effect distillation or compressor driven heat pumps, and RAHP can advantageously be incorporated to provide even further recovery. The reboiler and/or reflux condenser can be built into the column, even including interboilers and intercondensers.

Any separation process requiring heat input at a temperature and heat rejection at a lower temperature still above ambient will benefit by incorporating an RAHP to recover and recycle rejected heat back to supply heat. Typical thermally activated separation processes involving gas purification, including the locations where heat is supplied and rejected, are described in standard chemical engineering references such as "Gas Purification" third edition by A. Kohl and F. Riesenfeld, Gulf Publishing Co., Houston Texas, 1979.

In the preferred embodiment in which steam is the preferred working fluid, it is possible to provide other electrolytes or mixtures of electrolytes in addition to or in place of LiBr as the absorbent solution. In particular the alkali nitrates and nitrites, LiCl, $CaCl_2$, and alkali hydroxides all have favorable characteristics. It is also known to provide organic additives to improve the phased change performance of the electrolyte, including alcohols, glycols, amines, etc. One advantage of the steam electrolyte combination is that no rectification in a countercurrent contactor is necessary, which is advantageous because rectification imposes an unavoidable temperature differential.

The solution concentration change of the absorbent through its working cycle should fall in the range of 2 to 15 weight percent. It is controlled by the pumping rate of the solution pump.

What is claimed is:

1. A fractional distillation process comprising feeding a multicomponent mixture to a fractionating apparatus comprising at least one fractionating column, reboiler, and reflux condenser; supplying heat at a first temperature to said reboiler; rejecting heat at a second temperature lower than said first temperature from said reflux condenser; and withdrawing at least bottom and overhead products from said apparatus; wherein the improvement comprises:
    (a) absorbing a gaseous working fluid at a first pressure into an absorbent solution which is in indirect heat exchange contact with said reboiler, thereby transferring at least part of said heat at a first temperature from said absorbent solution to said reboiler;
    (b) regenerating said absorbent solution for recycle to step (a) by:
        (i) lowering the pressure to a second pressure no more than 70% of said first pressure;
        (ii) supplying heat to said absorbent solution thereby causing gaseous working fluid at said second pressure to desorb from said absorbent solution;
        (iii) increasing the pressure of said absorbent solution to approximately said first pressure;
    (c) providing said gaseous working fluid at the first pressure for recycle to step (a) by:
        (i) condensing said gaseous working fluid at the second pressure;
        (ii) increasing the pressure of the condensed working fluid to approximately the first pressure;
        (iii) supplying heat to boil the working fluid at approximately the first pressure;

(d) providing said rejected heat at a second temperature via indirect heat exchange as the source of at least one of the heat supplies required in steps (b) (ii) and (c) (iii).

2. The process according to claim 1 comprising supplying vaporous overhead product so as to provide heat of condensation to both the absorbent solution desorption step and the condensate boiling step.

3. The process according to claim 1 comprising supplying vaporous overhead product so as to provide heat of condensation only to the condensate boiling step, and supplying a low temperature source of heat to the absorbent solution desorption step.

4. The process according to claim 1 comprising supplying vaporous overhead product so as to provide heat of condensation only to the absorbent solution desorption step.

5. The process according to claim 1 wherein the working fluid is $H_2O$ and the absorbent solution is an electrolyte, and comprising maintaining the change in solution concentration from weak to strong between 2 and 15 weight percent.

6. The process according to claim 1 wherein regenerative heat exchange is provided between gaseous working fluid at the second pressure and condensed working fluid, and between gaseous working fluid at the first pressure and part of the weak absorbent solution.

7. In a thermally activated separation process which requires that heat be supplied at a first temperature and rejected at a second temperature lower than the first but above ambient temperature, the improvement which comprises:

(a) providing a reverse absorption heat pump comprising a high pressure absorber, low pressure generator, solution heat exchanger, solution pump, condenser, feed pump, and boiler;

(b) supplying at least part of said rejected heat to at least one of said generator and boiler;

(c) supplying at least part of said first temperature heat by indirect heat exchange from said absorber to said separation process.

8. The process according to claim 7 wherein the process is distillation.

9. The process according to claim 7 wherein the reverse absorption heat pump additionally comprises a second generator, second condenser in indirect heat exchange contact with said second generator, and a second feed pump; and comprising the additional steps of supplying gaseous working fluid generated in said generator to said second condenser; supplying gaseous working fluid generated in said second generator to said condenser; pumping condensed working fluid out of said condenser with said feed pump; and pumping condensed working fluid out of said second condenser with said second feed pump.

10. A fractional distillation process comprising:
(a) feeding a multicomponent mixture to a fractionating column;
(b) absorbing at least part of the overhead vapor from said column in an absorbent solution thereby releasing heat;
(c) indirectly transferring said heat to at least part of the bottom product from said column thereby providing column reboil;
(d) regenerating said absorbent solution for additional absorption by decreasing the pressure, supplying heat to boil off the absorbed overhead vapor, and restoring the pressure.

* * * * *